United States Patent [19]

Kadakia

[11] 3,866,023

[45] Feb. 11, 1975

[54] APPARATUS AND METHOD FOR BIDIRECTIONAL SHIFT REGISTER OPERATION

[75] Inventor: Virendra K. Kadakia, Los Angeles, Calif.

[73] Assignee: Honeywell Information Systems, Inc., Waltham, Mass.

[22] Filed: Dec. 29, 1971

[21] Appl. No.: 215,965

[52] U.S. Cl. ...... 235/92 SH, 235/92 R, 235/92 LG, 307/221 R, 328/37, 340/168 S

[51] Int. Cl. .......................................... H03k 21/06

[58] Field of Search ...... 235/92 SH, 92 NG, 92 LG; 307/221; 328/37; 340/146.3 K, 168 S

[56] References Cited

UNITED STATES PATENTS

| | | | |
|---|---|---|---|
| 3,277,283 | 10/1966 | Rabinow | 340/146.3 K |
| 3,374,468 | 3/1968 | Muir | 328/37 |
| 3,496,475 | 2/1970 | Arnold | 307/221 R |
| 3,610,903 | 10/1971 | Stokes | 235/92 SH |

*Primary Examiner*—Gareth D. Shaw
*Assistant Examiner*—Robert F. Gnuse
*Attorney, Agent, or Firm*—Ronald T. Reiling

[57] ABSTRACT

A shift register including apparatus for reversing an order of information contained in shift register cells. Shifting of information in a first direction is accomplished by conventional circuit techniques. Shifting of information in a second direction is accomplished by reversing the order of the information contained the register cells, shifting the information in the first direction by the conventional circuit techniques, and a second reversing of the order of the information.

12 Claims, 5 Drawing Figures

APPARATUS AND METHOD FOR BIDIRECTIONAL SHIFT REGISTER OPERATION

BACKGROUND OF THE INVENTION

This invention pertains to apparatus found in data processing units for the manipulation of the information or data content of each cell of a data register. More particularly, the apparatus is a shift register providing for the shifting of the content of each register cell to a different register cell occupying a specified position with respect to the original cell.

Several types of shift registers are known in the prior art. For example, apparatus for shifting the information to an adjoining cell in either direction (i.e., a shift of plus or minus one cell position), activated the requisite number of times, results in a shifting of the cell position of any magnitude. Similarly, when the end cells of a shift register are coupled together to form cyclic shift register, a shift of one position in a given direction, where the shift operation is repeated a sufficient number of times, is equivalent to a shift of the cell content of arbitrary magnitude in either direction.

However, a shift of several register cell positions, accomplished by successive shifts of one cell position, may occupy an unacceptable time interval for the data processing unit. To increase the speed of the shift register, multiple paths are provided, with appropriate control circuits, for providing a shift of arbitrary magnitude in a single operation. The gain in the speed of the shift register is accomplished at the expense of greatly increased complexity.

In the present invention, the apparatus necessary for shifting the content of the register cells in one direction is retained, while the apparatus necessary for shifting data in a second direction is replaced by apparatus necessary for reversing the order of the contents of the cells of the shift register. The apparatus for reversing positions of the contents of the register cells involves far fewer logic elements than the shifting apparatus which it replaces while still providing for the shifting of cell contents in the second direction. The use of fewer elements in the present invention results in an increase (to three) of the number of operations of the register to provide a shift in the second direction. However, the number of operations is still far fewer than the number of operations potentially required in apparatus permitting only a single position shift of cell contents.

It is therefore an object of the present invention to provide an improved shift register.

It is a further object of the present invention to provide for a bidirectional shift of information content of register cells by apparatus which reduces the number of circuit elements without requiring the large number of operations of the register potentially necessary where the apparatus for a shift of only one position is available.

It is another object of the present invention to provide for bidirectional shifting of cell contents of a shift register where apparatus for shifting in only one direction is provided along with apparatus for reversing the order of data in shift register cells.

SUMMARY OF THE INVENTION

The aforementioned objects are accomplished, according to the present invention, in a cyclic bidirectional shift register by providing apparatus for reversing the positions of the contents of the register cells along with conventional apparatus for shifting the contents of the register cells in a first direction.

The apparatus for reversing the order of the contents of the register cells comprise logic circuits which permit the exchange of data between corresponding cell positions. This apparatus for reversing cell contents involves fewer elements than the apparatus for shifting register cell contents in a second direction which it replaces. The apparatus for reversing the position of the contents of the register cells and the apparatus for shifting the register cell contents in a first direction are used to produce the equivalent of a shift of cell contents in a second direction. To achieve this result, the order of the register cell contents are first reversed, then the contents are shifted the same number of cell positions in the first direction of the shift desired in the second direction, and the order of the register cell contents are reversed a second time.

DESCRIPTION OF THE PREFERRED EMBODIMENT

Figure 1:
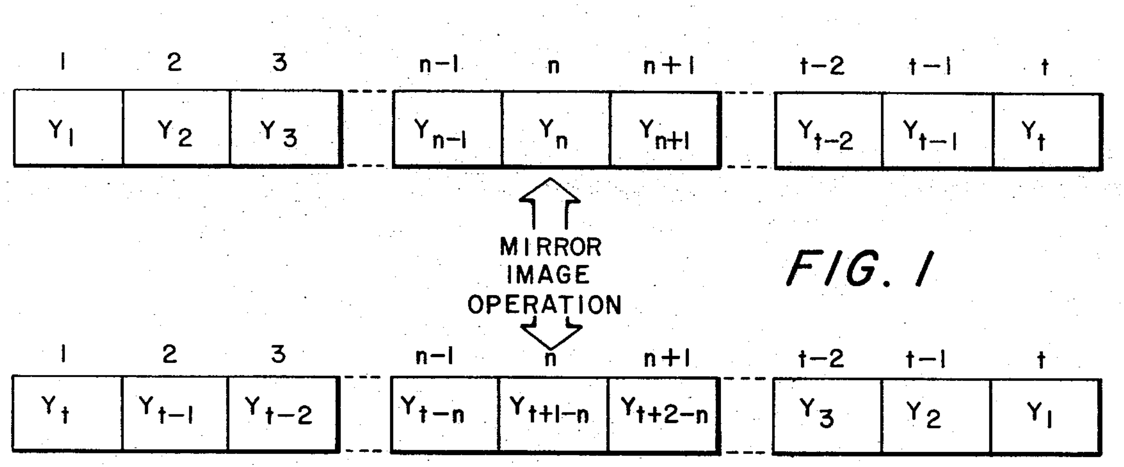
FIG. 1 is a flow diagram showing the change in order of register cell contents $Y_l$ through $Y_n$, of register cells $l$ through $n$, resulting from a mirror image operation (i.e., reversing the order of the cell contents in the register cells).

Referring now to FIG. 1, the effect of reversing the order, referred to as a mirror image operation, on data contained in register cells is shown. The register cells, shown symbolically as squares are numbered from $l$ through $n$ to $t$. The data contained in those register cells has been labelled $Y_l$, ..., $Y_{n-l}$, $Y_n$, $Y_{n+l}$, ..., $Y_{t-l}$, $Y_t$ corresponding to the initial cell positions occupied by the data. By performing the mirror image operation, or reversing the order of the data, data contained in an arbitrary cell $n$ is exchanged with the data from a cell $t+l-n$. The operation causes the data in cell $n$ to change from $Y_n$ to $Y_{t+l-n}$, while the data in cell $t+l-n$ changes from $Y_{t+l-n}$ to $Y_n$. The arrows pointing in both directions connote the reversible nature of the operation.

Figure 2A:
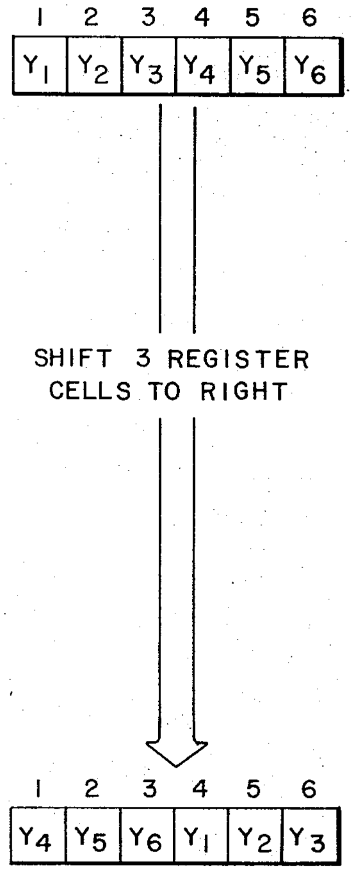
FIG. 2*a* and FIG. 2*b* show flow diagrams for shifting the position of the contents register cells three positions in a first direction according to the conventional procedure (FIG. 2*a*) and according to the present invention (FIG. 2*b*).
Figure 2B:
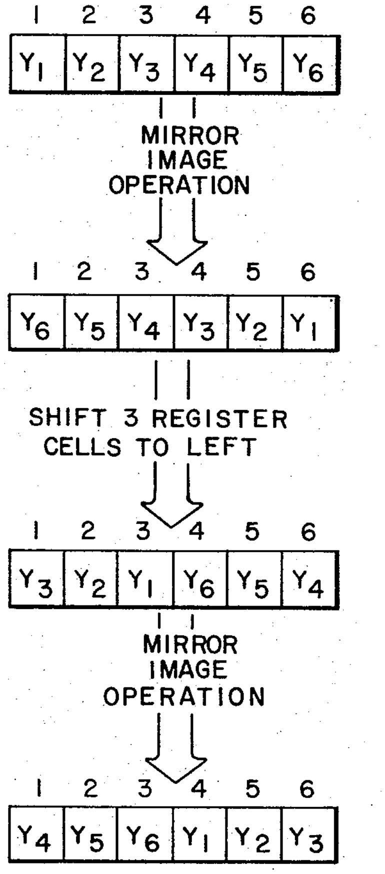

Referring next to FIG. 2*a* and FIG. 2*b*, the equivalence of a shift of the data contents of register cells, in a first direction and a shift of data contents of register cells using both mirror image operations and a shift of the data contents of register cells in a second direction is shown. In FIG. 2*a*, the result of the shifting of the data contents, $Y_1$, ..., $Y_6$, of six register cells, three registers to the right, is displayed. The same result is obtained, in FIG. 2*b*, by first reversing the order of the data contents $Y_1$, ..., $Y_6$ of the register cells (i.e., performing a mirror image operation on the data content of the register), shifting the contents of the register cell three register cells to the left, and followed by a second reversing of the order of the data contents of the register cells. FIG. 2*b* displays the result of each step on the contents of register cells and by comparison with FIG. 2*a* shows the equivalence of the two procedures.

The equivalence can be demonstrated in general in the following manner. The data content $Y_n$ initially in cell $n$ is moved to cell $n+3$ for a positive shift of three cell positions in typical register cells. According to the present invention in a register unit containing $t$ cells, the data content $Y_n$ of register cell $n$ would be placed in cell $t+l-n$ by a mirror image operation. The data content of the cell $t+l-n$ (i.e., $Y_n$) is then shifted to $t+l-n-3$ for a negative shift of three cell positions. Finally a second mirror image operation places data $Y_n$ in cell $t+l-(t+l-n-3) = n+3$ as did the shift of three positions to the right. The number +3 can be replaced by an arbitrary integer $m$. Therefore a shift of the cell contents of a given magnitude in one direction is equivalent to a mirror image operation, followed by a shift in a second direction of the given magnitude and concluded by a second mirror image operation.

Figure 3:
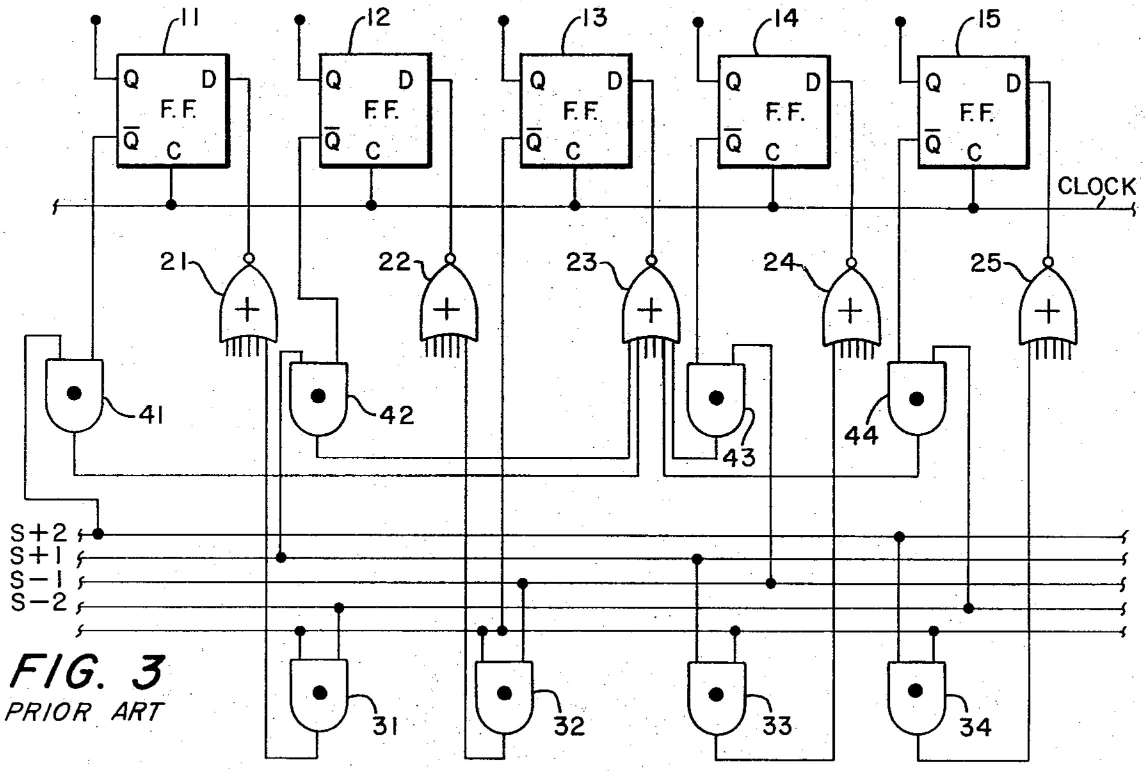
FIG. 3 PRIOR ART
FIG. 3 is a logic circuit diagram portion of a bidirectional shift register according to the prior art.

In FIG. 3, a logic circuit diagram of a portion of a bidirectional shift register, according to the prior art, is shown. A description of the operation of a similar circuit, containing four register cells and apparatus for shifting data one register cell position in either direction, is given in "Digital Electronics for Scientists," by H. V. Malmstadt and C. G. Enke, W. A. Benjamin, Inc., 1969, at page 270. FIG. 3 emphasizes the coupling of an arbitrary register cell, labelled 13 in that Figure, and contains the logic elements and control lines for shifting data 1 or 2 cell positions in either direction, into or out of register cell 13. The incomplete lines are included to indicate that the logic elements and control lines necessary for shifting data more than two positions in either direction are typically present, however the inclusion of such elements would complicate the following discussion without contributing to the understanding of the present invention.

Figure 4:
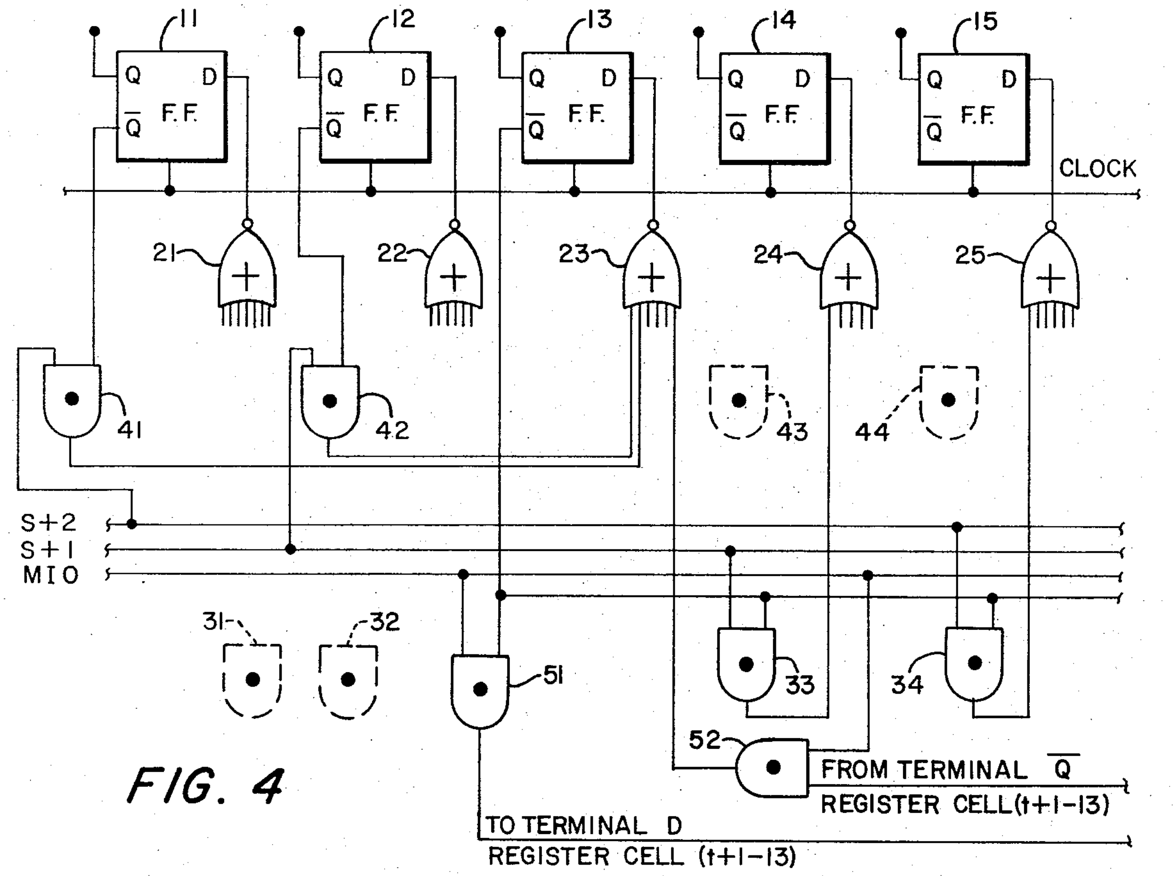
FIG. 4 is a logic circuit diagram portion of a bidirectional shift register according to the present invention.

In FIG. 4, a logic diagram of a portion of a shift register incorporating the present invention is shown. A group of register cells, comprised in the preferred embodiment of D type flip-flop circuits, are included in FIG. 4 as elements 11, 12, 13, 14 and 15. The operation of the D type flip-flop circuit, as well as logic elements to be discussed below are also described in "Digital Electronics for Scientists," by H. V. Malmstadt and C. G. Enke, W. A. Benjamin, Inc., 1969. In the D type flip-flop circuit, the binary signal level stored in the circuit is applied to output terminal Q, while the complement of the binary signal level applied to output terminal Q is applied to output terminal $\overline{Q}$. The signal which will be applied to output terminal Q, is applied to input terminal D. The signal at input terminal D is entered into the flip-flop circuit and consequently applied to terminal Q upon application of an appropriate signal on the line labelled CLOCK.

Attention is focused in FIG. 4, as in FIG. 3, on an arbitrary element 13 of a shift register where the apparatus is included for shifting binary signal levels one or two positions in one direction, i.e., to the right, into and out of element 13. The apparatus for shifting the cell positions binary signal levels greater than 2 is typically present for each register cell, but is represented in FIG. 4 as incomplete lines in order to facilitate discussion.

To shift binary signal levels from the output terminal Q of other register cells to the output terminal Q of element 13, an output terminal of logic NOR gate 23 is coupled to input terminal D of element 13. A complement of a binary signal to be entered into element 13 must be applied to an input terminal of NOR gate 23. One input terminal of NOR gate 23 is coupled to an output terminal of logic AND gate 42, while a second input terminal of NOR gate 23 is coupled to an output terminal of logic AND gate 41. One input terminal of AND gate 42 is coupled to line S+1 while a second terminal of AND gate 42 is coupled to the output terminal $\overline{Q}$ of element 12. Similarly, one input terminal of AND gate 41 is coupled to line S+2, while a second terminal of AND gate 41 is coupled to the output terminal $\overline{Q}$ of element 11. Thus for a data shift of a cell position to the right, an appropriate signal is applied to line S+1 (the control line for shifting data +1 cell position), thereby enabling logic AND gate 42. When AND gate 42 is enabled, the complement of the binary signal level applied to terminal $\overline{Q}$ of element 12 will be applied to terminal D of element 13. Thus the output signal at terminal Q of element 12 will be applied to terminal Q of element 13 when the appropriate signals are applied to line S+1 and the CLOCK line resulting in a shift of one cell position. Similarly, an appropriate signal applied to line S+2 (the control line for shifting data +2 cell positions), enabling AND gate 41, and to the CLOCK line, resulting in the binary signal level of terminal Q of element 11 being applied to terminal Q of element 13.

In an analogous manner, the binary signal level applied to terminal Q of element 13 is shifted one register cell position to the right and applied to the output terminal $\overline{Q}$ of element 14 or two register cell positions to the right and applied to the output terminal Q of element 15 by the apparatus shown in FIG. 4. The output terminal Q of element 13 is coupled to one input terminal of logic AND gate 33 and to the input terminal of logic AND gate 34. A second input terminal of AND gate 33 is coupled to the S+1 line, while the output terminal of AND gate 33 is coupled to one input of logic NOR gate 24. An output terminal of NOR gate 24 is coupled to input terminal D of element 14. In order to shift data one cell position to the right, appropriate signals applied to the S+1 line, for enabling AND gate 33, and to the CLOCK line result in the application of the binary signal level terminal Q of element 13 to output terminal Q of element 14. A second terminal of logic AND gate 34 is coupled to the S+2 line while the output terminal of AND gate 34 is applied to one input terminal of logic NOR gate 25. An output terminal of NOR gate 25 is coupled to input terminal D of element 15. For shifting data two cell positions to the right, appropriate signals applied to the S+2 line, for enabling AND gate 34, and to the CLOCK line, result in the application of the binary signal level of terminal Q of element 13 to output terminal Q of element 15.

The mirror image operation is achieved by exchanging the binary signal level of output terminal Q of element 13 with the binary signal level of output terminal Q of element $t+l-13$, where $t$ is the number of register cells and 13 is the position (in order) of element 13. To achieve the exchange of binary signal levels, a control line labelled MIO is provided. This control line is coupled to one input terminal of logic AND gate 51 and one input terminal of logic AND gate 52. The second input terminal of logic AND gate 51 is coupled to output terminal $\overline{Q}$ of element 13, while an output terminal of gate 51 is coupled through a logic NOR gate (not shown) to an input terminal D of element $t+l-13$. A second input terminal of AND gate 52 is coupled to output terminal $\overline{Q}$ of element $t+l-13$, while an output terminal of AND gate 52 is coupled to a third terminal of NOR gate 23. The application of appropriate signals to the MIO line, for enabling AND gates 51 and 52, and to the CLOCK line will result in the exchange of the binary signal levels applied to the output terminals Q of elements 13 and $t+l-13$. (In shift registers containing an odd number of register cells, data occupying the register cell in the center position is unaltered in a mirror image operation.)

A shift register, according to the preferred embodiment of the present invention would typically be arranged as a cyclic shift register. This coupling of the shift register cells prevents the loss of data from the register cells.

As described above, a shift in a first direction can be performed by apparatus for exchanging the order of data in the register cells of a shift register and for shifting the position of data in the register cells in a second direction. In FIG. 4, apparatus for exchanging data positions is implemented with two logic AND gates 51 and 52, which replace logic AND gates 31, 32, 43 and 44 needed to shift the data either one or two positions in the first direction as shown in FIG. 3. Two additional logic AND gates would be eliminated for each additional cell position which the apparatus is capable of shifting data during each operation.

While the shift register of the preferred embodiment employs D type flip-flop circuits as register cells, implementation with other types of flip-flop circuits is possible as will be readily apparent to those skilled in the art.

The above description is included to illustrate the operation of the preferred embodiment and is not meant to limit the scope of the invention. The scope of the invention is limited only by the following claims. A person skilled in the art can readily discern many changes and variations in the above description which are yet within the spirit and scope of the invention.

What is claimed:

1. Apparatus for bi-directional shifting of data in storage elements comprising:

a first group of said storage elements ordered serially;

a second group of said storage elements ordered serially, wherein said first group and said second group contain an equal number of said storage elements;

exchange means coupled to said first group and to said second group for exchanging data held in a corresponding one of said storage elements of said second groups automatically in one step; and shift means coupled to said first and second groups for changing the position of data held in each of said groups relative to the respective storage elements thereof.

2. The apparatus of claim 1 including:

control means comprising four control lines coupled to said exchange means and to said shift means for controlling said shift means and said exchange means.

3. The apparatus of claim 2 wherein said storage elements are comprised of flip-flop circuits, wherein said shift means and said exchange means are comprised of logic circuits including AND gates, and wherein said control means produces control signals, a preselected two of said control signals enabling said exchange means.

4. A method of bi-directional shifting of ordered data stored in a group of storage elements comprising:

shifting of said ordered data in a first direction in said group of storage elements while retaining the order of said order data; and, producing an equivalent of a shifting of said ordered data in a second direction in said group of elements comprising the steps of:

reversing the order of said ordered information in said group of elements, shifting of the reversed ordered data in a first direction in said group a number of positions equal to the number of positions desired for the second direction shift while retaining the relative order of the data, and reversing the order of the data in said group of elements.

5. A method of bi-directional shifting of ordered data in a group of storage elements comprising:

shifting of said ordered data in a first direction in said group of elements while retaining the order of said ordered data; and producing an equivalent of shifting said ordered data in a second direction while retaining the order of said ordered data comprising the steps of, exchanging data between each one of a first subgroup of said elements and a corresponding one of a second subgroup of said group of elements, shifting of the ordered information in a first direction in said group of elements a number of positions equal to the number of positions desired for the second direction shift while retaining the order of the data, and exchanging data between each one of said first subgroup of said elements and corresponding one of said second subgroup of elements.

6. In a group of elements storing ordered data, apparatus for bidirectional shifting of said ordered data comprising:

shift means coupled to said group of elements for producing a change in position of said ordered data in said group relative to the respective elements thereof;

gating means coupled to said group of elements for reversing the order of said data in said group relative to the respective elements thereof; and control means coupled to said shift means and said gating means for delivering control signals for controlling said shift means and said gating means; said control means producing a shift of said data in a first direction in said group by delivering a control signal to said shift means; and said control means producing a shift of said data in a second direction in said groups by delivering control signals in succession to said gating means, to said shift means and to said gating means.

7. The apparatus of claim 6 wherein said shift means produces said change in position in a first direction.

8. The apparatus of claim 7 wherein said elements are comprised of flip-flop circuits and wherein said shift means and said gating means are comprised of logic elements.

9. Apparatus for bi-directional shifting of data in storage elements comprising:

a first group of said storage elements;

a second group of said storage elements;

selectively controllable exchange means coupled to said first group and to said second group for exchanging the data held in each one of said storage elements of said first group with the data held in a corresponding one of said storage elements of said second group;

selectively controllable shift means coupled to said first and second groups for changing the position of the data held in each of said groups relative to the respective storage elements thereof, and wherein, a last element of each one of said groups is coupled to a first element of the other of said groups; and control means coupled to said exchange means and to said shift means for delivering control signals for selectively controlling said shift means and exchange means; said control means producing a shift of said data in a first direction in said groups by delivering a control signal to said shift means; and, said control means producing a shift of said data in a second direction in said groups by delivering control signals in succession to said exchange means, to said shift means and to said exchange means.

10. The apparatus of claim 9 wherein a last element of each one of said groups is coupled to a first element of the other of said groups.

11. The apparatus of claim 10 wherein storage elements are comprised of flip-flop circuits; and wherein said shift means and said exchange means are comprised of logic gates, said logic gates enabled by said control signals.

12. Apparatus for bi-directional shifting of data in storage elements comprising:

a first group of said storage elements;

a second group of said storage elements, wherein said first group and said second group contain an equal number of said storage elements;

selectively controllable exchange means coupled to said first group and to said second group for exchanging data held in each one of said storage elements of said first group with data held in a corresponding one of said storage elements of said second group;

selectively controllable shift means coupled to said first and second groups for changing position of data held in each of said groups in a first direction relative to respective storage elements thereof; and control means coupled to said shift means and to said exchange means for delivering control signals for selectively controlling said shift means and said exchange means; said control means producing a shift of said data in said first direction in said groups by delivering a control signal to said shift means; and, said control means producing a shift of said data in a second direction in said groups by delivering control signals in succession to said exchange means, to said shift means and to said exchange means.

* * * * *